United States Patent [19]

Sakai et al.

[11] Patent Number: 5,140,091
[45] Date of Patent: Aug. 18, 1992

[54] COMPOSITIONS OF POLYETHER COMPOUNDS, EPOXY COMPOUNDS AND PROCESSES FOR PRODUCTION THEREOF BASED ON 4-VINYLCYCLOHEXENE-1-OXIDE

[75] Inventors: Katsuhisa Sakai; Hiroyuki Oshima, both of Hiroshima, Japan

[73] Assignee: Daicel Chemical Industries Ltd., Tokyo, Japan

[21] Appl. No.: 604,279

[22] Filed: Dec. 20, 1990

Related U.S. Application Data

[62] Division of Ser. No. 318,309, Mar. 3, 1989.

[30] Foreign Application Priority Data

Mar. 3, 1988 [JP] Japan ................................. 63-50361
Mar. 4, 1988 [JP] Japan ................................. 63-51213

[51] Int. Cl.$^5$ ............................................. C08G 59/42
[52] U.S. Cl. ..................................... 528/103; 528/361; 528/366; 528/393; 525/529
[58] Field of Search ................ 528/103, 361, 366, 393

[56] References Cited

U.S. PATENT DOCUMENTS 4,565,859  1/1986  Murai et al. .......................... 528/391

Primary Examiner—John C. Bleutge
Assistant Examiner—Frederick Krass
Attorney, Agent, or Firm—Sughrue, Mion, Zinn, Macpeak & Seas

[57] ABSTRACT

Disclosed are a composition comprising polyether compounds, obtained by addition copolymerization of a mixture of 4-vinylcyclohexene-1-oxide and a compound having at least two epoxy groups with a compound having at least one active hydrogen atom, and a composition comprising epoxy compounds obtained by epoxidation of the composition of the polyether compounds. The invention also relates to processes for production thereof.

The disclosed composition comprising epoxy compounds has a higher softening temperature compared that produced by polymerization of only 4-vinylcyclohexene-1-oxide with a compound having at least one active hydrogen atom.

2 Claims, 1 Drawing Sheet

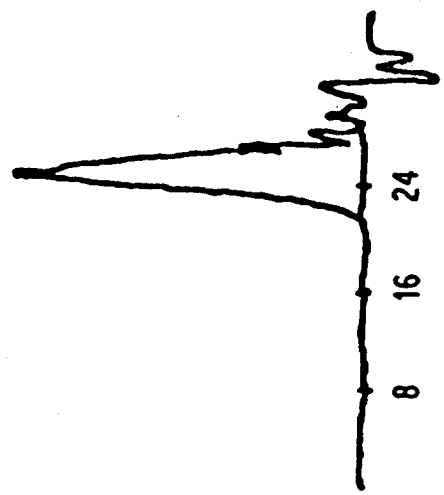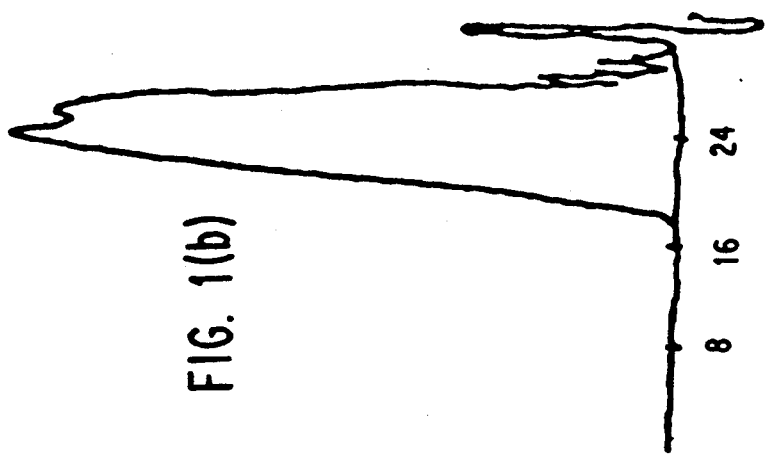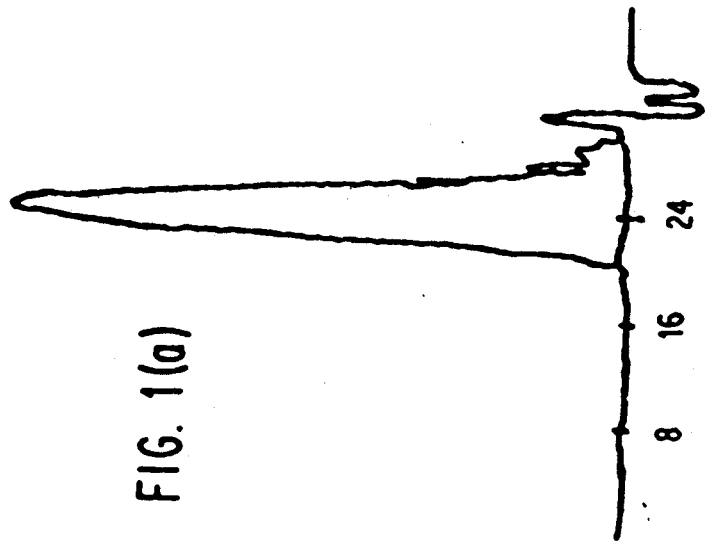

COMPOSITIONS OF POLYETHER COMPOUNDS, EPOXY COMPOUNDS AND PROCESSES FOR PRODUCTION THEREOF BASED ON 4-VINYLCYCLOHEXENE-1-OXIDE

This is a division of application Ser. No. 07/318,309, filed on Mar. 3, 1989.

FIELD OF THE INVENTION

The present invention relates to composition comprising polyether compounds having vinylcyclohexane units and ether units, and furthermore crosslinked structures, in the molecules thereof, and corresponding compositions of alicyclic epoxy compounds, and to processes for production of said polyether compounds and said epoxy compounds.

The alicyclic epoxy compounds of the present invention have a higher softening temperature, that is, blocking resistibility even under high temperature and pressure, compared with those in which crosslinked structures are not formed, and have nearly equal molecular weight, without any loss of weatherability, water resistance, etc.

BACKGROUND OF THE INVENTION

Hitherto, polyether compounds such as polyethylene glycol, polypropylene glycol, polytetramethylene glycol, etc., have been widely used as raw materials for resins, such as polyurethanes, for coatings, adhesives, molding materials, etc.

Many of these polyether compounds have hydroxyl groups at the terminal portion thereof, which causes a problem in that the scope of applications for use is restricted in the case of using them as a raw material for resins.

For the purpose of overcoming this problem, polyether compounds having an allyl group at the terminal portion thereof, which are prepared by polymerizing the glycidyl ether, and polyester compounds having a vinyl group at the terminal portion thereof, which are prepared by thermal decomposition of polypropylene glycol, etc., have been used.

However, many resins obtained by using these compounds are insufficient in hardness and strength, even though they have excellent flexibility because the molecular structure of these compounds is straight chain.

On the other hand, epoxy resins which have been widely used in industry include so-called epi-bis type epoxy resins produced by reacting bisphenol A and epichlorohydrine.

These resins have advantages, e.g., various products can be obtained, from a state of liquid to solid, and they can be cured at room temperature with polyamines because reactivity of epoxy resins is high.

However, cured products thereof have faults in that the weatherability is inferior, electric properties such as anti-tracking property, etc., are inferior, and the heat distortion temperature is low, although they do have desirable characteristics of good water resistivity and strength.

In recent years, particularly epoxy resins prepared by reacting phenol resin or novolak resin with epichlorohydrin have been used as resins for encapsulating VLSI (very large scale integrated circuit), etc., but chlorine contained in the resins, typically in an amount of several hundred parts per million, causes the problem of deteriorating the electric properties of such electronic devices.

Epoxy resins having excellent electric properties and heat resistance which do not contain chlorine are known, such as certain alicyclic epoxy resins.

These have been produced by an epoxidation reaction of a compound having a 5- or 6-membered cycloalkenyl structure.

The epoxy group in these resins is the so-called inner epoxy group, and curing is usually carried out with acid anhydrides by heating.

However, since reactivity is low, they cannot be cured with polyamines at room temperature.

Therefore, use of the alicyclic epoxy resins is restricted within a very narrow scope.

As alicyclic epoxy resins, those having a structure represented by formula (I) or (II) have been industrially produced and used.

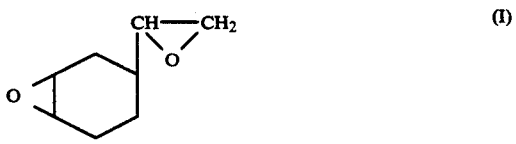

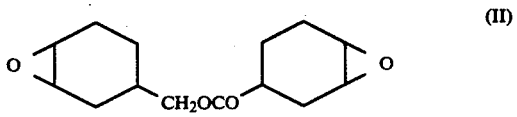

(I) has been used as a heat resistible epoxy diluent, because of having a very low viscosity, but it is high in toxicity and causes the problem of poisoning upon contacting skin of the human body.

(II) contains only small amounts of impurities and has low color hue, and cured products produced therewith have a high heat distortion temperature, but its use involves problems of inferior water resistivity due to the ester bond.

In addition, because (I) and (II) are liquid state epoxy resins having a low viscosity, it is impossible to apply molding systems for solid epoxy resins, such as transfer molding, etc., to them.

From the above viewpoint, novel alicyclic epoxy resins which have oxycyclohexane units had been disclosed in Japanese Application Laid-open No. 166675/1985 (=U.S. Pat. No. 4,565,859).

However, the epoxy resins disclosed in Japanese Application Laid-open No. 166675/1985 were only obtained as those having relatively low softening temperatures.

Therefore, the epoxy resin produced by the above described process has been used by adding thereto a blocking inhibitor such as calcium stearate, etc., because they apt to bring about blocking (i.e., adherence of layers to each other) especially when left at high temperatures in summer.

However, the addition of a blocking inhibitor deprives them of general-purpose properties.

Furthermore, there is not only the matter of overcoming the above described problems, but as the number of methods or objects involving use of epoxy resins have grown, so have the desired characteristics of such epoxy resins; for example, epoxy resins having higher softening temperature, excellent water resistance, and excellent ductility. have increased.

From the above viewpoint, improvements in epoxy resins such as that disclosed in Japanese Application Laid-open No. 166675/1985 have been required.

SUMMARY OF THE INVENTION

As a result of intensive studies in order to develop novel com;positions of polyether compounds and epoxy compounds, there has now been found a novel composition of polyether compounds, obtained by addition copolymerization of a mixture of 4-vinylcyclohexene-1-oxide and a compound having at least two epoxy groups with a compound having at least one active hydrogen atom, and a novel composition of epoxy compounds obtained by epoxidation of the polyether compounds.

Furthermore, it has surprisingly been found that the epoxy compounds has a higher softening temperature compared with that produced by polymerization of only 4-vinylcyclohexene-1-oxide with a compound having at least one active hydrogen atom.

The composition of epoxy compounds has many kinds of complicated crosslinked structures which are formed by a compound having at least two epoxy groups.

Accordingly, the composition of epoxy compounds shows apparently higher molecular weight in gel permeation chromatography (GPC) analysis.

Accordingly, the disclosed composition of epoxy compounds has more excellent blocking resistibility even under high temperature and pressure conditions.

Thus, according to the intensive studies of the present inventors, it has now been discovered that a composition of epoxy compounds obtained by epoxidation of a polyether compound obtained by addition copolymerization of 4-vinylcyclohexene-1-oxide and a compound having at least two epoxy groups, with a compound having at least one active hydrogen atom, as compared with the case where the compound having at least two epoxy groups is not copolymerized, has a higher softening temperature. This results in improved blocking resistibility, without loss of other excellent characteristics such as heat resistibility, water resistibility, flexibility, glass transition temperature, etc. Thus, the present invention has been accomplished.

In a further aspect, the invention relates to processes for production of the noted compositions.

BRIEF DESCRIPTION OF THE DRAWING

FIGS. 1(a), 1(b), and 1(c) are charts and data illustrating the results of gel permeation chromatography (GPC) analysis of the compositions polyether compounds obtained in Synthesis Examples 2 and 3, and Comparative Synthesis Example 1, respectively.

DETAILED DESCRIPTION OF THE INVENTION

The present invention is now described below in more detail.

In the polyether compounds of the present invention, the organic compounds having at least one active hydrogen atom include alcohols, phenols, carboxylic acids, amines, and thiols.

As alcohols, for instance, either monohydric alcohols or polyhydric alcohols may be used.

Examples include aliphatic alcohols such as methanol, ethanol, propanol, butanol, pentanol, hexanol, octanol, allyl alcohol, etc., aromatic alcohols such as benzyl alcohol, and polyhydric alcohols such as ethylene glycol, diethylene glycol, triethylene glycol, polyethylene glycol, propylene glycol, dipropylene glycol, 1,3-butanediol, 1,4-butanediol, pentanediol, 1,6-hexanediol, neopentyl glycol, neopentyl glycol oxypivalate, cyclohexane dimethanol, glycerine, diglycerine, polyglycerine, trimethirol propane, trimethirolethane, pentaerythritol, dipentaerythritol, etc.

Phenols include phenol, cresol, catecol, pyrogallol hydroquinone, hydroquinone monomethyl ether, bisphenol A, bisphenol F, 4,4'-dihydroxybenzophenone, bisphenol S, phenol resin, cresol novolak resin, etc.

Carboxylic acids include formic acid, acetic acid, propionic acid, butyric acid, fatty acid of animal and vegetable oils and fats, fumaric acid, maleic acid, adipic acid, dodecanedioic acid, trimellitic acid, pyromellitic acid polyacrylic acid, phthalic acid, isophthalic acid, terephthalic acid, etc. In addition, compounds having a hydroxyl group together with a carboxylic acid group such as lactic acid, citric acid, oxycaproic acid, etc., are also included.

Amines include monomethylamine, dimethylamine, monoethylamine, diethylamine, propylamine, monobutyl amine, dibutylamine, pentylamine, hexylamine, cyclohexylamine, octylamine, dodecylamine, 4-4'-diaminodiphenylmethane, isophorondiamine, toluenediamine, hexamethylene diamine, xylenediamine, diethylene triamine, triethylene tetramine, ethanolamine, etc.

Thiols include mercaptans such as methyl mercaptan, ethyl mercaptan, propyl mercaptan, phenyl mercaptan, etc., mercaptopropionic acid or polyhydric alcohol esters of mercaptopropionic acid, such as ethyleneglycol bismercaptopropionate, trimethylolpropane trimercaptopropionate, pentaerythritol pentamercaptopropionic acid, etc.

Other compounds having at least one active hydrogen atom include polyvinyl alcohol, partially hydrolyzed products of polyvinyl acetate, starch, cellulose, cellulose acetate, cellulose acetate butyrate, hydroxyethyl cellulose, acrylic polyol resins, styrene-allyl alcohol copolymer resins, styrene-maleic acid copolymer resins, alkyd resins, polyesterpolyol resins, polyester carboxylic acid resins, polycaprolactone polyol resins, polypropylene polyol, polytetramethyleneglycol, etc.

The compounds having at least one active hydrogen atom, may have an unsaturated double bond in their structure, examples of which include allyl alcohol, acrylic acid, methacrylic acid, 3-cyclohexene methanol, tetrahydrophthalic aid, etc.

The unsaturated double bond in these compounds may have a structure that is epoxidated.

The compounds having at least one active hydrogen atom, described above, can also be used in the form of a mixture of more than two kinds of the compounds.

4-vinylcyclohexene-1-oxide

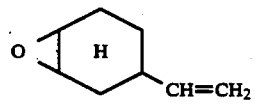

which is one starting material useful for forming a novel composition of polyether compounds of the present invention, can be industrially produced by partial epoxidation of 4-vinylcyclohexene, which is produced by dimerization of butadiene, using, e.g., peracetic acid, hydrogen peroxide, etc.

A compound having at least two epoxy groups which is another starting material of the novel compositions of polyethers compound of the present invention includes the following compounds which also be used as a mixture of two or more thereof, viz., an alicyclic epoxy resin formed of compounds such as

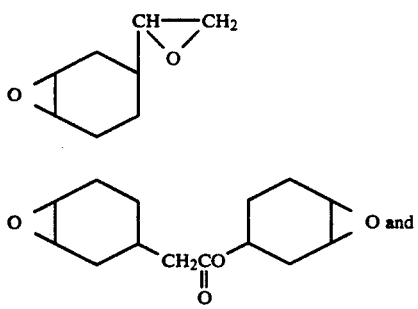

polyalcohols such as

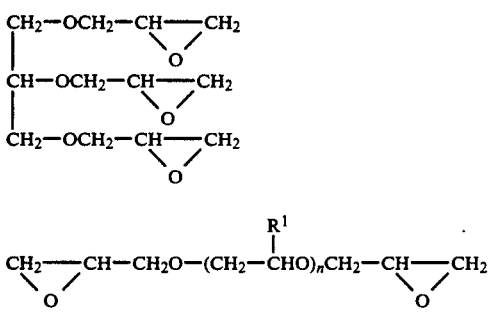

(wherein $R^1$ is hydrogen atom or alkyl group), and glycidylether of polyglycol, polyolefin epoxy resins such as epoxidated soy bean oil, epoxidated linseed oil etc., heterocyclic epoxy resins such as diglycidyl hydantoin, triglycidylisocyanurate, etc., glycidyl amine type resins such as tetraglycidyl diaminodiphenylmethane, triglycidyl p-aminophenol etc., glycidyl ester type resins such as diglycidyl phthalate or diglycidyl tetrahydrophthalate, etc., and also bisphenol A type epoxy resins or bisphenol F type epoxy resins, novolak type epoxy resins etc.

The composition of polyether compounds, which is a precursor of the epoxy resin, can be obtained by addition copolymerization of a mixture of 4-vinylcyclohexene-1-oxide and a compound having at least two epoxy groups described above with a compound having at least one active hydrogen atom described above, in the presence of catalyst, in accordance with the present invention.

In this case, in the composition of polyether compounds obtained, the 4-vinylcyclohexene-1-oxide or the compound having at least two epoxy groups are converted into a linear structure in which they are randomly combined with each other via linkages generated by the ring-opening of the epoxy groups possessed by them, or by a structure containing partially crosslinked structures.

It is a feature of the present invention that such partially crosslinked structures are introduced into a molecule, and it is believed that it contributes to the enhancement of the softening temperature, that is, improvement of the blocking resistibility of the obtained epoxy compound.

In addition, depending on reaction conditions (described hereinafter) utilized, there can be cases wherein a part of the epoxy groups in the compound having at least two epoxy groups remain as such.

The compound having at least one active hydrogen atom used as an initiator remains as the residual group of an alkyl moiety, the ether group, and the terminal hydrogen atom or atoms in the epoxy compound.

For example, when trimethylopropane, i.e., $CH_3CH_2C(CH_2OH)_3$, is used as the compound having at least one active hydrogen atom, in the polyether compound obtained, the residue and the terminal hydrogen atoms remain as the structure $$CH_3CH_2C(CH_2O)_3(Y)_nH_3 \quad \text{(III)}$$

wherein, in the formula (III), n is an integer of 3 to 100, determined depending on the ratio of the compound having at least one active hydrogen atom to 4-vinylcyclohexene-1-oxide and the compound having at least two epoxy groups used in the reaction, and Y is a randomly combined structure or a partially crosslinked structural part thereof, which is made by combining ether linkage moieties generated by the ring opening of the epoxy group moieties of the 4-vinylcyclohexene-1-oxide and the compound having at least two epoxy groups, or depending on reaction conditions, there can be formed structures having at least two molecules of $CH_3CH_2C(CH_2O)_3(Y)_nH_3$ that have been crosslinked at the moiety Y.

On reaction, a compound having one epoxy group, which does not have vinyl groups other than 4-vinylcyclohexene-1-oxide, may also be copolymerized.

In such a case, however, the ratio of 4-vinylcyclohexene-1-oxide to the compound having one epoxy group other than 4-vinylcyclohexene-1-oxide should be such that the former is in the range of from 1 to 100% and the latter is from 99 to 0%.

If the former is not more than 1%, the content of the vinyl groups is small, and also the feature of the cyclohexane units cannot be shown.

In this reaction, from 0.01 to 1 mole of the compound having at least one active hydrogen atom and from 0.001 to 0.5 mole, preferably from 0.01 to 0.2 mole of the compound having at least two epoxy groups, are reacted per mole of the total of the 4-vinylcyclohexene-1-oxide and the compound having one epoxy group other than 4-vinylcyclohexene-1-oxide.

If the compound having at least one hydrogen atom is not more than 0.01 mole, the effect as the initiator is less.

On the other hand, if the compound having at least two epoxy groups is not more than 0.001 mole, it cannot modify epoxy compound, whereas if it is not less than 0.5 mole, its molecular weight is too high to be used practically.

On addition polymerization of a mixture of the 4-vinylcyclohexene-1-oxide and the compound having at least two epoxy groups to the compound having at least one active hydrogen atom, the 4-vinylcyclohexene-1-oxide and the compound having at least two epoxy groups may be reacted simultaneously.

Alternatively, it is also possible to react either 4-vinylcyclohexene-1-oxide or a compound having at least two epoxy groups first, and then react the other to its reacted addition product.

Further, it is also possible to react both 4-vinylcyclohexene-1-oxide and a compound having at least two epoxy groups, and further it is possible to react either of them first and then react therewith both the 4-vinylcyclohexene-1-oxide and the compound having at least two epoxy groups simultaneously.

In carrying out the above reactions, catalysts that can be used include, for example, amines such as methylamine, ethylamine, propylamine, piperazine, etc., organic bases such as pyrazines, imidazoles, etc., organic acids such as quaternary ammonium salts such as tetrabutyl ammonium bromide, etc., formic acid, acetic acid, propionic acid, etc., inorganic acids such as sulfuric acid, hydrochloric acid, etc., alcholates of alkali metals such as sodium methylate, etc., alkalis such as KOH, NaOH, etc., Lewis acids such as $BF_3$, $ZnCl_2$, $AlCl_3$, $SnCl_4$, etc., or complex compounds of the Lewis acids, and organometallic compounds such as triethylaluminium, diethyl zinc, etc.

These catalysts are generally used in a concentration of from 0.01 to 10%, and preferably from 0.1 to 5%, based on the total weight of starting materials.

The reaction is generally carried out at a temperature of $-20°$ to $200°$ C., and preferably from $0°$ to $120°$ C.

The reaction is generally also carried out in the presence of solvent. A solvent having active hydrogen atoms cannot be used. Thus, ketones such as acetone, methyl ethyl ketone, methyl isobutyl ketone, etc., aromatic solvents such as benzene, toluene, xylene, etc., and ethers, aliphatic hydrocarbons, esters, can be used.

In succession, the epoxy resin of the present invention can be produced by reaction of vinyl groups of the polyether compound obtained by the above described methods, which already contains crosslinked structures formed by the compound having at least two epoxy groups, with epoxidating agent such as peracid or hydroperoxides.

As peracids, performic acid, peracetic acid, perbenzoic acid, trifluoroperacetic acid, etc.

Of these peracetic acid is a preferable epoxidating agent, because it is available industrially at a moderate price and has high stability.

As hydroperoxides, hydrogen peroxide, tertiary butyl hydroperoxides, cumen peroxide, etc., can be used.

In carrying out epoxidation, catalyst can also be used as is appropriate under the circumstances.

In the case of peracids, for example, alkalis such as sodium carbonate, etc., acids such as sulfuric acid, etc., can be used as a catalyst.

In the case of hydroperoxides, it is possible to obtain a catalytic effect, for example, by using the mixture of tungstic acid and sodium hydroxide together with hydrogen peroxide, or hexacarbonylmolybdenum together with tertiary butyl hydroperoxides.

The epoxidation reaction is carried out in the absence or presence of a solvent, controlling the reaction temperature according to the apparatus used and the properties of the raw materials.

The temperature region of the epoxidation reaction is selected according to the reactivity of the epoxidating agent.

In the case of peracetic acid, which is a preferable epoxidating agent, the preferable temperature range is from $0°$ to $70°$ C.

In the case of a temperature under $0°$ C., the reaction velocity is slow. On the other hand, in the case of a temperature over $70°$ C., a decompositin reaction of the peracetic acid occurs.

In the case of tertiary butyl hydroperoxidemolybedenum dioxide diacetyl acetate, which is an example of hydroperoxide, preferable temperature range is from $20°$ to $150°$ C., based on the same considerations.

The use of solvents for dilution is effective in view of decreasing the viscosity of raw materials and stabilization of epoxidation agent.

In the case of peracetic acid as epoxidating agent, a preferable solvent is an aromatic compound ether, ester, etc.

The molar ratio of epoxidating agent to be used to unsaturated bonds, that is, vinyl groups, can be selected according to the amount of the unsaturated bonds to be retained.

In the case of preparing epoxy compounds having many epoxy groups, an equal or higher molar ratio of epoxidating agents to the unsaturated bonds is preferably used.

However, using amounts of epoxidating agents at a molar ratio of more than 2 with respect to the unsaturated bonds are not preferable, because of cost and the side reaction described below.

In the case of peracetic acid, a ratio of from 1/1 to 1.5/1 is preferable.

When trimethylolpropane is used as the compound having at least one active hydrogen atom, the epoxidized compound of the present invention obtained as the result of the above-described reaction is that having the formula $$CH_3CH_2C(CH_2O)_3(Z)_nH_3 \qquad (IV)$$

wherein n is the same as in the case of above-described formula (III), and Z is a mixture containing those in which the vinyl group contained in Y in the case of the polyether compound of the above-described formula (III) has been changed as the described below.

Depending on the conditions of the epoxidation reaction, there may be produced a mixture of a cyclohexanepolyether structure containing the unreacted vinyl group in the starting material, i.e.,

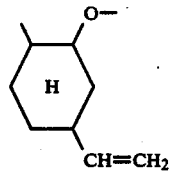

at the same time, with epoxidation of the vinyl group in the 4-vinylcyclohexene-1-oxide a cyclohexane polyether structure having an epoxy group produced by the epoxidation, i.e.,

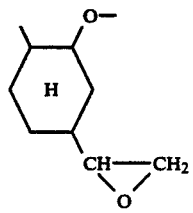

and a cyclohexane polyether structure having a modified substituent.

In the case that peracetic acid is used as the epoxidating agent, the substituents described above are mainly composed of the following units

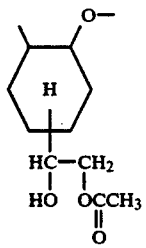

which are produced by a reaction between epoxy groups and acetic acid by-produced.

In the structures described above, at least one

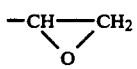

group should be contained, and it is more desirable that the number of

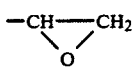

groups is relative large, and it is more desirable that the number of

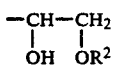

groups is relatively small in the epoxy resin of the present invention. In the foregoing, $R^2$ is a hydrogen atom, alkyl group, alkyl carbonyl group or aryl carbonyl group.

Since the compound having at least two epoxy groups used in the present invention does not contain a vinyl group, unlike the 4-vinylcyclohexene-1-oxide, and thus does not participate in the epoxidation, the substituent described above is not produced.

When a compound of formula

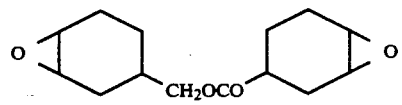

is used as the compound having at least two epoxy groups simultaneously with the 4-vinylcyclohexene-1-oxide, the moiety having polyether structure produced from the above-described compound is a mixture of those of following two formulae

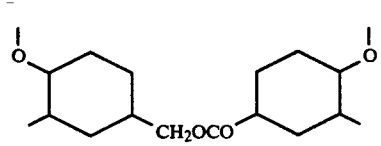

There may be a case wherein a linear structure is formed only from these polyether structural parts produced from a compound formed of two or more compounds, and also a case wherein these polyether structural parts and the cyclohexane polyether structure produced from 4-vinylcyclohexene-1-oxide form a linear random structure in one part thereof and a crosslinked structure in another part thereof.

Whether crosslinked structures are present in the molecule may be confirmed as follows.

That is, it may be accomplished by subjecting the conventional polyether compound having a similar molecular weight but obtained by not copolymerizing a compound formed of a compound having at least two epoxy groups and the compound having at least one active hydrogen atom according to the present invention, i.e., obtained by copolymerizing a compound having at least two epoxy groups to gel permeation chromatography (GPC) analysis, and comparing the patterns of the obtained charts and data of molecular weights, etc.

FIG. 1(a), FIG. 1(b), and FIG. 1(c) are those for the polyether compound obtained in Synthesis Examples 2, 3 and Comparative Synthesis Example 1, respectively.

The respective measuring conditions, as well as the numerical values for the number-average molecular weight (MN), weight-average molecular weight (MW), and molecular weight distribution (MW/MN) are set forth. below:

| FIG. 1(a) | | | | FIG. 1(b) | | | | FIG. 1(c) | | | |
|---|---|---|---|---|---|---|---|---|---|---|---|
| GPC FILE | | | | GPC FILE | | | | GPC FILE | | | |
| I.TIME | 0 | Q.FACROR | 1 | I.TIME | 0 | Q.FACROR | 1 | I.TIME | 0 | Q.FACROR | 1 |
| MOL MAX | 6.5 | MOL DIV | 5.5 | MOL MAX | 6.5 | MOL DIV | 5.5 | MOL MAX | 6.5 | MOL DIV | 5.5 |
| MOL MIN | 1 | TIME MAX | 34 | MOL MIN | 1 | TIME MAX | 34 | MOL MIN | 1 | TIME MAX | 34 |
| TIME DIV | 10 | TIME MIN | 14 | TIME DIV | 10 | TIME MIN | 14 | TIME DIV | 10 | TIME MIN | 14 |
| METHOD | 0022 | S.PERIOD | 0 | METHOD | 0022 | S.PERIOD | 0 | METHOD | 0022 | S.PERIOD | 0 |
| ALPHA | 100 | KAPPA | 1 | ALPHA | 100 | KAPPA | 1 | ALPHA | 100 | KAPPA | 1 |
| CHANNEL 1 | | | | CHANNEL 1 | | | | CHANNEL 1 | | | |
| 1 | | | | 1 | | | | 1 | | | |
| MN = 657.88 | | MW = 1386.38 | | MN = 849.513 | | MW = 3863.19 | | MN = 486.361 | | MW = 672.718 | |
| MZ = 5783.35 | | | | MZ = 17218.3 | | | | MZ = 1401.85 | | | |

-continued

| FIG. 1(a) | | FIG. 1(b) | | FIG. 1(c) | |
|---|---|---|---|---|---|
| MW/MN = 2.10734 | MZ/MN = 8.79089 | MW/MN = 4.54754 | MZ/MN = 20.2684 | MW/MN = 1.38317 | MZ/MN = 2.88222 |

Table 1 indicates mole numbers of the following compounds:
(1) trimethyolylpropane (TMP)
(2) 4-vinylcyclohexene-1-oxide (VCN)
(3) 4-vinylcyclohexene diepoxide (VCD)
(4) 3,4-epoxycyclohexyl-3,4-epoxycyclohexene carboxylate (Celloxide 2021);
and also indicates the viscosity of the obtained compounds in Synthesis Examples from 1 to 5 and Comparative Synthesis Examples from 1 to 2.

Table 2 indicates the numerical values for the molar ratio of VCN alone or the mixture with VCD to TMP which is the initiator in Synthesis Examples and Comparative Synthesis Examples, and the molar ratio of epoxy groups to TMP.

It may be expected that a crosslinked structure has been formed in the polyether compound, in which the diepoxy compound has been copolymerized, since the polyether compound obtained in Comparative Synthesis Example 1 in which the molar ratio of the epoxy compound to the TMP initiator used was greater than those in Synthesis Example 2 and 3 (that is, its molecular weight was expected greater) showed a pattern giving an impression that its molecular weight is smaller.

Further, it is also believed that even the epoxy compounds obtained by epoxidation of the pending vinyl groups possessed by both polyether compounds still have such a difference because they will have the same main structure as before.

The desired compound can be separated from the crude reaction solution by conventional chemical engineering means such as concentration techniques.

In the following, the present invention is further illustrated by examples.

SYNTHESIS EXAMPLE 1

Synthesis of Polyether Compound 7.1 g (0.05 mol) of trimethylolpropane was dissolved into 124 g (1.0 mol) of 4-vinylcyclohexene-1-oxide, and then 5.0 g (0.03 mol) of 4-vinylcyclohexenediepoxide was added into the solution.

Then, ethyl acetate containing 2.7 g of $BF_3$ etherate was added dropwise with keeping the temperature of 50° C. for 4 hours, and were reacted.

After adding dropwise, it was confirmed that trimethylolpropane and 4-vinylcyclohexene-1-oxide and 4-vinylcyclohexenediepoxide almost disappeared in gas chromatography analysis.

Next, 200 g of ethyl acetate was added into the crude reaction solution, and was washed/with 300 g of pure water three times.

Then, the low boiling fractions were removed from the washbed reaction solution to obtain a polyether compound with a rotary evaporator.

SYNTHESIS EXAMPLES 2,3

Synthesis of Polyether Compound

Synthesis example 1 was repeated, except that the reaction ratios among trimethylolpropane, 4-vinylcyclohexene-1-oxide and 4-vinylcyclohexene diepoxide were changed to obtain polyether compounds respectively.

SYNTHESIS EXAMPLE 4,5

Synthesis of Polyether Compound

Synthesis example 1 was repeated except that 3,4-epoxycyclohexyl-3,4-epoxycyclohexanecarboxylate (Celloxide 2021 produced by Daicel Chemical Co., Ltd.) was replaced to 4-vinylcyclohexenediepoxide and reaction ratios were changed to obtain polyether compounds respectively.

COMPARATIVE SYNTHESIS EXAMPLE 1,2

Synthesis of Polyether Compound

Synthesis example 1 was repeated except that only trimethylolpropane and 4-vinylcyclohexene-1-oxide were used to obtain polyether compounds, respectively.

EXAMPLE 1

Synthesis of Epoxy Compound

Ethyl acetate containing 91.2 g (1.2 mol) of peracetic acid was added dropwise into the ethyl acetate solution of the polyether compound obtained in the above Synthesis Example 1 with keeping the temperature of 50° C. for 4 hours.

The reaction solution was additionally aged with keeping the temperature of 50° C. for 2 hours and was washed with 300 g of pure water three times.

And then, low boiling fractions were removed from the washed reaction solution to obtain a desired epoxy compound with a rotary evaporator.

EXAMPLE 2,3

Synthesis of Epoxy Compound

Example 1 was repeated, except that the polyether compounds obtained in the above Synthesis Examples 4 and 5 were used to obtain epoxy compounds, respectively.

COMPARATIVE EXAMPLES 1,2

Synthesis of Epoxy Compound

Example 1 was repeated except that the polyether compounds obtained in the above Comparative Synthesis Example 1 and 2 was used to obtain epoxy compounds, respectively.

APPLICATION EXAMPLE 1

The epoxy compounds obtained in the above described Examples 1 to 5 and Comparative Examples 1 to 2 and a phenol resin (PSM 4300 produced by Gunei Chemical Co., Ltd., phenol equivalent 110) and triphenyl phosphine were melted and blended to obtain an epoxy resin composition with blending ratios as shown in Table 3.

The resulting composition was cooled and powdered, and then molded by compression under a pressure of 100 kg/cm$^2$ at 150° C., followed by curing at 170° C. for 2 hours to obtain a cured product.

The blending ratios and glass transition temperatures and the water absorption ratios are shown in Table 2.

From the data shown in Table 1, especially data shown in Example 2 and Comparative Example 1, it is obvious that the resin having crosslinked structures in a molecule has a 20° C. higher softening temperature, even in the epoxy resin having the same degree of epoxy equivalence (molecular weight per 1 epoxy group). Furthermore, from the data shown in Table 3, it is obvious that the other properties, for example, the water absorption ratio, etc., is not changed. It is, incidentally known that epi-bis type epoxy resins have very different chemical structures in the case of a softening temperature difference of 20.

TABLE 1

|  | Synthesis Example | | | | | Comparative Synthesis Example | |
|---|---|---|---|---|---|---|---|
|  | 1 | 2 | 3 | 4 | 5 | 1 | 2 |
| TMP | 0.05 | 0.07 | 0.07 | 0.07 | 0.07 | 0.05 | 0.07 |
| VCM | 1.0 | 1.0 | 1.0 | 1.0 | 1.0 | 1.0 | 1.0 |
| VCD | 0.034 | 0.07 | 0.15 | — | — | — | — |
| Celloxide 2021 | — | — | — | 0.017 | 0.034 | — | — |
| Viscosity (cp/90° C.) | 3270 | 13300 | 63600 | 1790 | 5170 | 600 | 1390 |

TABLE 2

|  | Synthesis Example | | Comparative Synthesis Example |
|---|---|---|---|
|  | 2 | 3 | 1 |
| $\frac{VCM + VCD}{TMP}$ | 15.28 | 16.43 | 20.0 |
| $\frac{epoxy\ group}{TMP}$ | 16.29 | 18.57 | 20.0 |

TABLE 3

|  | Synthesis Example | | | | | Comparative Synthesis Example | |
|---|---|---|---|---|---|---|---|
|  | 1 | 2 | 3 | 4 | 5 | 1 | 2 |
| epoxy compound | 100 | 100 | 100 | 100 | 100 | 100 | 100 |
| phenol resin | 67 | 62 | 56 | 70 | 69 | 61 | 62 |
| triphenyl phosfine | 1.67 | 1.62 | 1.56 | 1.70 | 1.69 | 1.61 | 1.62 |
| glass (°C.) transition temperature | 211 | 215 | 205 | 209 | 210 | 207 | 205 |
| water absorption ratio | 0.25 | 0.24 | 0.24 | 0.26 | 0.27 | 0.28 | 0.27 |
|  | (%/20° C. 24 hours immersion in water) | | | | | | |

While the invention has been described in detail and with reference to specific embodiments thereof, it will be apparent to one skilled in the art that various changes and modifications can be made therein without departing from the spirit and scope thereof.

What is claimed is:

1. A composition comprising polyether compounds, said composition being obtained by addition copolymerization of a mixture of 4-vinylcyclohexene-1-oxide and a compound having at least two epoxy groups with a compound having at least one active hydrogen atom.

2. A process for production of a composition comprising polyether compounds comprising addition copolymerization of a mixture of 4-vinylcyclohexene-1-oxide and a compound having at least two epoxy groups with a compound having at least one active hydrogen atom.

* * * * *